Feb. 20, 1951 A. W. SIMON ET AL 2,542,950

PERMEABILITY TUNED RADIO RECEIVER

Filed May 9, 1947 2 Sheets-Sheet 1

Inventors:
Alfred W. Simon
George L. Johnson Jr.
By: Hinkle, Horton, Ahlberg, Hausmann & Hupper
Attorneys.

PERMEABILITY TUNED RADIO RECEIVER

Filed May 9, 1947 2 Sheets-Sheet 2

Inventors:
Alfred W. Simon
George L. Johnson Jr.
By: Hinkle, Horton, Ahlberg, Hausmann & Knapper
Attorneys.

Patented Feb. 20, 1951

2,542,950

UNITED STATES PATENT OFFICE 2,542,950

PERMEABILITY TUNED RADIO RECEIVER

Alfred W. Simon, St. Louis, Mo., and George L. Johnson, Jr., Chicago, Ill., assignors to Stewart-Warner Corporation, Chicago, Ill., a corporation of Virginia Application May 9, 1947, Serial No. 746,970

6 Claims. (Cl. 250—20)

The present invention relates to a variable permeability tuning system for radio receivers and particularly for superheterodyne receivers. Its primary object is the provision of new and improved core and coil structures in the signal frequency and oscillator circuits of the receivers for effecting tracking between them.

A further object of the present invention is to provide new and improved core and coil structures in the signal frequency and oscillator circuits of superheterodyne receivers enabling like coil and core structures to be used.

Another object of the present invention is the provision of new and improved core and coil structures in the signal frequency and oscillator circuits of superheterodyne receivers employing loop antennae and enabling like coil and core structures to be used.

Another and more specific object of the present invention is to provide a new and improved permeability tuned superheterodyne receiver employing a loop antenna comprising like permeability tuned units in signal frequency and oscillator circuits and a compensating means associated with the oscillator unit for introducing into the circuit a reflected reactance corresponding to that introduced into the signal frequency circuit by the antenna.

Figure 1:
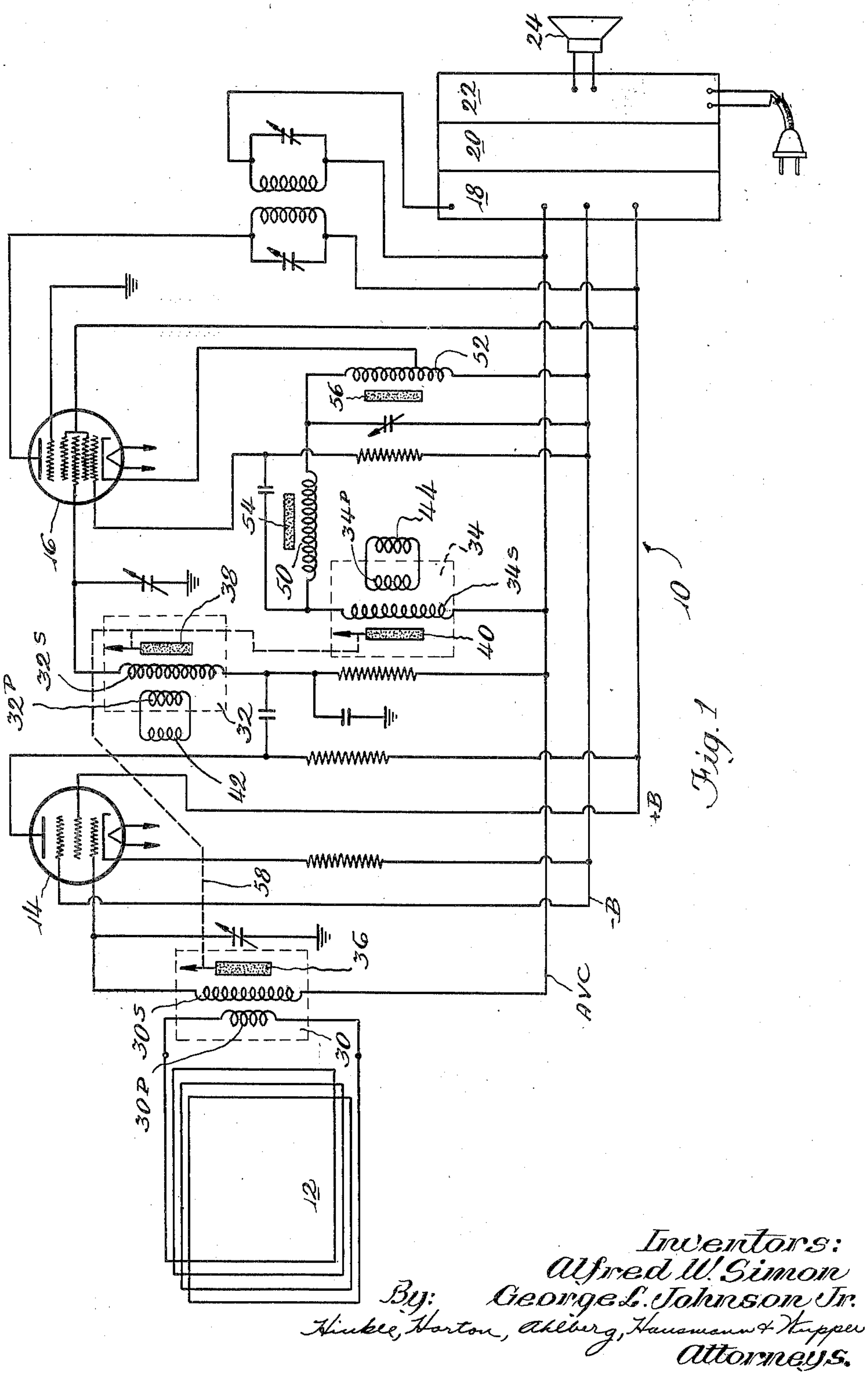
Figure 2:
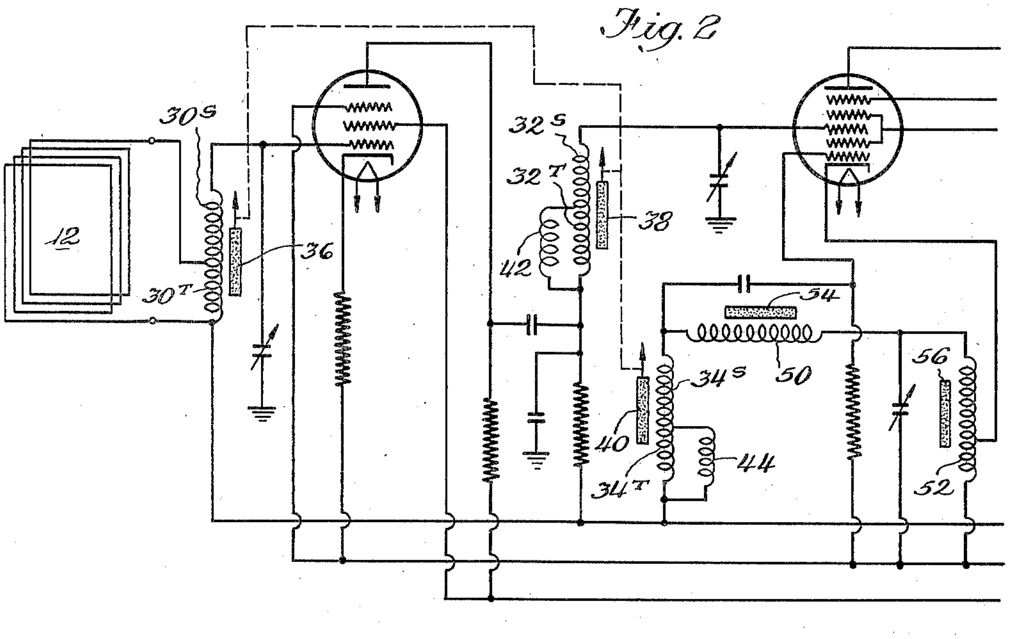
Figure 3:
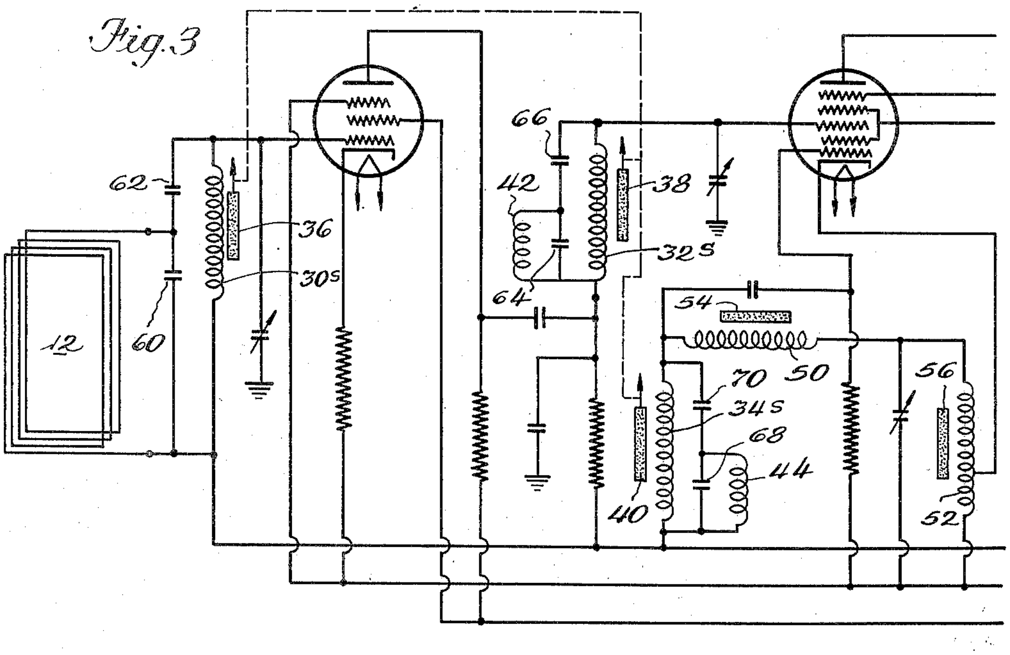

Other objects and advantages of the present invention will become apparent from the ensuing description in the course of which reference is had to the accompanying drawings, in which:

Fig. 1 is a schematic circuit diagram of a radio receiver embodying the invention; and Figs. 2 and 3 are fragmentary schematic circuit diagrams of other embodiments of the invention.

Referring first to Fig. 1, the radio receiver 10 there illustrated is of the superheterodyne type having a loop antenna 12. It includes a radio frequency amplifier tube 14, a combined first detector and oscillator tube 16, the connections of which are shown and will be hereafter described in detail, a section 18 including the intermediate frequency, second detector and A. V. C. components, a section 20 including the first audio frequency components, a section 22 including the audio output components and a loudspeaker 24. These latter sections may be of any conventional construction and they have, therefore, not been illustrated in detail.

As earlier indicated the present invention relates to permeability tuning and it enables the permeability tuning units to be constructed with identical core and coil structures. There are three such units 30, 32 and 34 in the illustrated receiver, although it should be understood that more or less units could be used. For example, only two units would be necessary if the radio frequency section were omitted. The units include identical magnetic cores and associated coils so that they can be made readily and economically.

The first unit 30 couples the antenna 12 to the tube 14. The coupling is effected inductively through windings 30P and 30S, the former of which is connected to the terminals of the antenna and the latter to the input circuit of tube 14. The magnetic core, which is preferably made of powdered iron, is indicated by reference character 36. Movement of the core 36 varies the tuning of the input or signal circuit of the radio receiver in known manner.

The radio frequency circuit coupling between tubes 14 and 16 includes the permeability tuning unit 32. The latter comprises coils 32P and 32S, which are identical to the coils 30P and 30S, and a magnetic core 38 identical with core 36.

The oscillator has associated with it the third permeability tuning unit 34. The latter includes the coils 34P and 34S identical with coils 32P and 32S and with coils 30P and 30S, respectively, and a core 40 identical with cores 36 and 38.

According to the present invention, compensator coils 42 and 44 having resistance, capacity and inductance characteristics corresponding to those of the antenna loop are coupled to the coils 32P and 34P so that the oscillator permeability tuning unit can be made to track with the signal and radio frequency units by use of the well known "3 point method" of tracking—i. e., by use of a series trimmer coil 50 and a shunt padder coil 52 having adjustable cores 54 and 56 associated therewith. The trimmer and padder coils also tune the oscillator circuit to the different, preferably higher, frequency that it has in a superheterodyne receiver. The addition of the compensator coils 42 and 44 having characteristics like that of the antenna causes the true inductance curves of units 30, 32 and 34 to coincide with the result that the well known "3 point method" of tracking the oscillator can be used. The effect of the compensator coils is to introduce into the radio frequency and oscillator circuits the same reflected reactance as the loop antenna introduces into the antenna circuit.

In tuning the receiver, the movable cores 36, 38 and 40 are moved in unison in known manner in by a single control device, which is shown diagrammatically by the reference character 58.

The main advantage of the present invention is that it enables the permeability tuning units to be made identical structurally, i. e., the cores, coil forms and coils are all the same. Consequently, their manufacture and assembly and the assembly of receivers are greatly expedited and costs are reduced. Also, tracking can be easily effected by use of the compensator coils and the series trimmer and shunt padder units.

The principles of the present invention are applicable to various types of coupling as illustrated by Fig. 2, in which tapped coupling is used, and by Fig. 3, in which capacitative coupling is used.

Inasmuch as the only differences between the previously described embodiment and the embodiment of Fig. 2 reside in the couplings, the following detailed description will emphasize the differences. In Fig. 2 the loop antenna 12 is connected to a tapped portion 30T of the winding 30S with which the movable core 36 is associated. In order that the compensator coils 42 and 44 introduce the same reflected reactance into the radio frequency and oscillator coils 32S and 34S as the loop antenna introduces into the coil 30S, the compensator coils are connected to tapped portions 32T and 34T of their associated coils. The tapped portions are identical so as to effect the desired result.

In the embodiment of Fig. 3, capacitative couplings are used. Thus, the antenna 12 is connected across a capacitor 60 connected in series with another capacitor 62 and the two capacitors are connected in parallel with the tuning coil 30S. In similar manner, the compensator coil 42 is connected across a capacitor 64 connected in series with a capacitor 66, the two capacitors being connected in parallel with the coil 32S. The compensator coil 44 is connected across a capacitor 68 which is connected in series with capacitor 70 and the two are connected in parallel with the coil 34S. In order that the compensator coils introduce the same reflected reactance into the radio frequency oscillator circuits as the loop antenna introduces into the antenna circuit, the capacitors 60, 64 and 68 are identical as are the capacitors 62, 66 and 70.

While the present invention has been described in connection with the details of three specific embodiments thereof, it should be understood that these are not intended to be limitative of the invention except in so far as set forth in the accompanying claims.

Having thus described our invention, what we claim as new and desire to secure by Letters Patent of the United States is:

1. In a permeability tuning system for a superheterodyne receiver, a signal frequency circuit and an oscillator circuit each having a tuning coil and each coil having a magnetic tuning core movable relative thereto inductively to tune the circuit, said tuning cores and said tuning coils being of like construction, a loop antenna, means coupling said antenna to said signal frequency circuit, a compensator coil having characteristics corresponding to the antenna, means coupling said compensator coil to said oscillator circuit in the same manner as said antenna is coupled to said signal frequency circuit, and means for moving said cores in unison.

2. In a permeability tuning system for a superheterodyne receiver, a signal frequency circuit and an oscillator circuit each having a tuning coil and each coil having a magnetic tuning core movable relative thereto inductively to tune its respective circuit, said cores and coils being of like construction, means for moving both said cores in unison for tuning both said circuits simultaneously, a loop antenna, means inductively coupling said antenna to said signal frequency tuning coil, and a coil having characteristics corresponding as to inductance, capacitance and resistance to those of said antenna, means inductively coupling the last said coil to said oscillator tuning coil for introducing into it a reflected reactance corresponding to that introduced into said signal frequency circuit by said antenna.

3. In a permeability tuning system for a superheterodyne receiver, a signal frequency circuit and an oscillator circuit each having a tuning coil and each coil having a magnetic tuning core movable relative thereto inductively to tune the circuit, said tuning cores being of substantially the same length and diameter and said tuning coils being of like construction, a loop antenna, a coupling coil connected to said antenna and inductively coupled to said signal frequency circuit tuning coil, a compensator coil having the same capacitance, inductance and resistance as said loop antenna, a coupling coil corresponding to said first mentioned coupling coil connected for coupling said compensator coil to said oscillator circuit tuning coil, and means connected with said cores adapted to move said cores in unison for tuning said circuits simultaneously.

4. In a permeability tuning system for a superheterodyne receiver, a signal frequency circuit and an oscillator circuit each including a tuning coil and having an adjacent relatively movable magnetic tuning core inductively to tune the circuit, said tuning cores being of substantially the same length and diameter and said tuning coils being of like construction, a loop antenna, means connecting said antenna to a portion of said signal frequency circuit tuning coil, a compensator coil having characteristics corresponding to the loop antenna, means connecting said compensator to a portion of said oscillator circuit tuning coil corresponding to said portion of said signal frequency circuit tuning coil, and a control mechanism connected with said cores to move said cores in unison for tuning said circuits simultaneously.

5. In a permeability tuning system for a superheterodyne receiver, a signal frequency circuit and an oscillator circuit each having a tuning coil and each coil having a magnetic tuning core movable relative thereto inductively to tune its respective circuit, said tuning cores being of substantially the same length and diameter and said tuning coils being of like construction, a loop antenna, a pair of capacitors connected across said signal frequency circuit tuning coil, means connecting said antenna across one of said capacitors, a compensator coil having characteristics corresponding to the loop antenna, a pair of capacitors corresponding to said first mentioned capacitors and identical thereto connected across said oscillator circuit tuning coil, means connecting said compensator coil across the one of said capacitors corresponding to the one across which the antenna is connected, and means for moving both said cores in unison for tuning both said circuits simultaneously.

6. In a superheterodyne receiver having a single tuning control member and having an antenna tuning circuit including an antenna coil having an adjacent relatively movable permeable tuning core connected with the control member, a loop antenna and coupling means adapted to couple the antenna with the circuit; the combination of an oscillator tuning circuit comprising an oscillator coil having an adjacent relatively movable permeable tuning core, a compensating coil, coupling means adapted to couple said compensating coil with said oscillator circuit, said oscillator coil, tuning core and coupling means being the same as the antenna coil, tuning core and coupling means respectively and said compensating coil having the same electrical characteristics as the antenna, and means connecting said oscillator tuning core with the control member for simultaneous oscillator and antenna tuning.

ALFRED W. SIMON.
GEORGE L. JOHNSON, Jr.

REFERENCES CITED

The following references are of record in the file of this patent:

UNITED STATES PATENTS

| Number | Name | Date |
|---|---|---|
| 2,061,991 | Wheeler | Nov. 25, 1936 |
| 2,359,684 | Sands | Oct. 3, 1944 |
| 2,383,286 | Beers | Aug. 21, 1945 |
| 2,417,182 | Sands | Mar. 11, 1947 |
| 2,425,454 | Bloch | Aug. 12, 1947 |
| 2,449,148 | Sands | Sept. 14, 1948 |